United States Patent [19]
Handke

[11] 3,912,060
[45] Oct. 14, 1975

[54] CLUTCH WITH CENTRIFUGAL PUMP

[76] Inventor: Kenneth E. Handke, 2034 Mayview Ave., Cleveland, Ohio 44109

[22] Filed: Oct. 23, 1973

[21] Appl. No.: 409,020

Related U.S. Application Data

[63] Continuation of Ser. No. 170,852, Aug. 11, 1971, abandoned.

[52] U.S. Cl. .......... 192/113 B; 192/58 C; 192/84 C; 192/85 CA; 192/104 R
[51] Int. Cl. ........................................... F16d 13/72
[58] Field of Search ............ 192/113 B, 58 R, 58 A, 192/58 B, 58 C, 59, 105 A, 85 F; 188/264 E, 264 P; 64/30 LB, 26

[56] References Cited
UNITED STATES PATENTS

| | | | |
|---|---|---|---|
| 2,576,156 | 11/1951 | Trofimor | 192/113 B |
| 2,714,946 | 8/1955 | Tenot et al. | 192/58 C |
| 2,733,796 | 2/1956 | McMillan et al. | 192/58 A |
| 2,808,140 | 10/1957 | Trofimor | 192/113 B X |
| 2,935,889 | 5/1960 | Adams et al. | 192/113 B X |
| 3,638,773 | 2/1970 | Lewis et al. | 192/113 B X |

FOREIGN PATENTS OR APPLICATIONS

| | | | |
|---|---|---|---|
| 742,120 | 12/1932 | France | 192/113 B |
| 1,157,862 | 7/1969 | United Kingdom | 192/113 B |

*Primary Examiner*—Benjamin W. Wyche
*Attorney, Agent, or Firm*—McNenny, Farrington, Pearne & Gordon

[57] ABSTRACT

A variable speed drive mounted within a housing includes clutch means of the disc type operatively connected between input and output shafts and an interior support-coupling member. The support-coupling member comprises a stationary support extending from the housing and concentric bearings for mounting a center coupling therein. The center coupling receives the extreme inboard ends of the shafts to provide support thereof and it is operatively connected between the clutch means and the output shaft to transmit torque. The concentric bearings permit relative rotation between one of the shafts and the center coupling, and provide bearing support for both of the shafts within the stationary support member. There is also provided fluid supply means for wet or hydroviscous torque transmitting units of the disc type, such as a clutch or brake, for efficient torque transmission and cooling. The fluid supply means comprise an annular, centrifugal pump mounted directly on a continuously rotating portion of the torque transmitting unit and fluid ducts in registery with the exhaust ports of the pump to deliver fluid to the discs. The present invention also provides preload means for eliminating the formation of an undesirable accumulation of fluid or an excessively thick film of fluid intermediate adjacent discs which otherwise interrupts the transmission of torque.

14 Claims, 3 Drawing Figures

INVENTOR.
KENNETH E. HANDKE
BY
McNENNY, FARRINGTON,
PEARNE & GORDON
ATTORNEYS

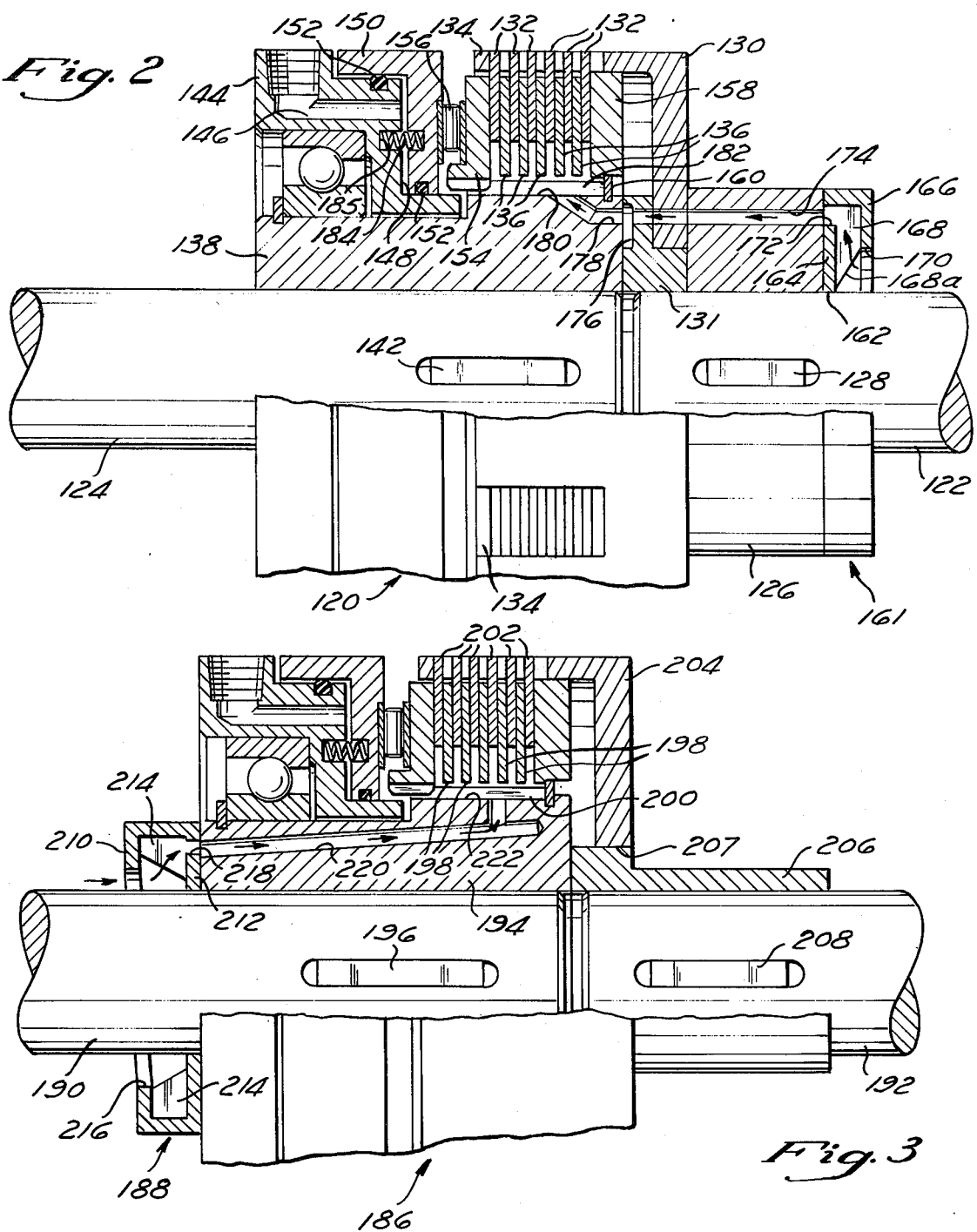

3,912,060

CLUTCH WITH CENTRIFUGAL PUMP

This is a continuation, of application Ser. No. 170,852, filed Aug. 11, 1971 and now abandoned.

FIELD OF INVENTION

The present invention generally relates to disc type torque transmitting units. In a particular aspect, the invention relates to a variable speed drive mounted within a housing having a support-coupling member therein to provide rigid bearing support for the inboard ends of the shafts and to transmit torque. An integrally formed fluid supply means for wet or hydroviscous torque transmitting units of the disc type is also provided. In addition, the present invention also provides preload means for maintaining a predetermined axial loading of the discs and thereby eliminating an excessive accumulation of fluid intermediate the rotating discs of such a torque transmitting unit.

PRIOR ART

The prior art discloses a variety of variable speed drive units wherein a disc type clutch is connected between input and output shafts for the transmission of torque. The drive unit is typically mounted within a housing which provides outboard bearing support for the shafts in or on the opposed walls of the housing. In order to effectively cope with radial loading of the shafts and minimize the degree of cantilever support thereof, additional interior bearing support for each of the shafts is generally provided intermediate the outboard bearings and the clutch.

In many instances, an independent, additional interior bearing support is provided adjacent each of the shaft ends resulting in the use of four independent bearing supports in the drive unit. Alternatively, a structure having multiple, axially spaced bearings which are themselves supported in a cantilever arrangement may be employed in the drive unit. In all such units, the extreme inboard ends of the shafts are subject to a degree of cantilever support since the ends are directly connected to the clutch which cannot be conveniently supported in a rigid structure. Of course, the restraint of radial loads and radial displacement of the shafts is not efficiently achieved in a cantilever support arrangement.

It should be appreciated that disc type clutch means are not flexible couplings and the axial-radial alignment thereof must be maintained within a close tolerance range. For example, if axial movement resulted in engagement of the clutch body and driven gear, a drag load resulting in overheating would result. Conversely, if the body and gear were actually spaced beyond the tolerance range, the discs would slip off the gear resulting in a loss of torque and eventual clutch failure. Similar problems occur if radial alignment is not maintained, since it also results in irregular disc wear and/or tracking of the rotating discs which will eventually result in clutch failure. The adequacy of the bearing support and maintenance of proper alignment is especially critical when the drive unit is employed in a cyclic operation involving variable loads. Thus, the prior art units have not been entirely satisfactory structurally.

In addition to the structural problems, the economic disadvantages of multiple, independent bearings and cantilever bearing arrangements for support of the shafts should be appreciated. Further, the axial spacing required by multiple inboard bearings necessitates an increased axial length of the unit resulting in commensurate cost increases and undesirable bulk of the unit.

The interior zone defined by the housing frequently contains a heat exchanger for cooling of a circulated fluid in a wet or hydroviscous clutch application as described below in greater detail. In such units, the structure associated with the multiple inboard bearings may interfere with the mounting and efficiency of the heat exchanger.

The dissipation of the heat developed during the operation of a torque transmitting unit of the disc type is a design parameter and, in fact, next to load and torque the dissipation of the heat developed is the most important factor. When high cyclic rates and/or high load inertias are involved, the heat dissipating ability of the unit is of greater concern than its torque limitations. Of course, the torque transmitted by the unit is effected by the temperature of the disc surfaces and a uniform temperature should be maintained if consistency of operation is desired.

In a disc type torque transmitting unit such as a clutch or a brake, heat is primarily generated by mechanical losses in the engaging discs or disc pack as a result of slippage and friction developed during acceleration and deceleration of the load. When the torque transmitting unit is used in a constant slip application such as a tension or drag apparatus, large amounts of frictional heat are continuously generated. In these instances, the clutch may be operated in a fluid bath, such as oil, to enhance heat dissipation and the unit is described as a wet application.

The high rates of heat generation present in a constant slip application are, of course, also present in a hydroviscous torque transmitting unit which is a continuous slip device wherein the torque is transmitted by the shearing of a film of fluid such as oil intermediate the adjacent discs. The amount of torque transmitted and, therefore, the output speed of the unit is inversely related to the rate of shear and the thickness of the fluid film. In this instance, the torque transmitting fluid or oil also serves as a cooling fluid to enhance heat dissipation.

The prior art teaches the operation of such units in an oil bath contained in the housing and the use of a pump to deliver oil to the disc pack. The pump may be mounted externally of the housing and arranged to draw oil from a fluid sump and thereafter deliver it to the disc pack by means of a duct drilled through the input or output shaft. The rotating discs act somewhat like a centrifugal pump ejecting the oil radially outwardly between the adjacent discs. This arrangement is not satisfactory since it entails extensive drilling of the shaft and requires additional drive and control structure for the pump as well as pump connection lines.

The prior art also teaches the internal mounting of the pump at a location remote from the clutch or brake. In this instance, the pump is arranged to draw oil from an oil sump defined by the housing. Such an arrangement is not entirely satisfactory since it frequently entails additional pump mounting structure and the delivery of the oil to the disc pack from a remote location within the housing which necessitates relatively high pressure heads to overcome the pressure drop due to fluid flow frictional losses. Such pressure heads are also undesirable for reasons that will become more apparent below. Further, the selection of the pump and torque transmitting units must be coordinated with regard to size and necessary connecting structure.

Whenever a torque transmitting and/or cooling oil is employed in a torque transmitting unit, it is necessary to prevent the excessive accumulation of such fluid intermediate the discs since such an accumulation tends to separate the discs and prevent the efficient transmission of torque by the unit. The use of pumping means to deliver the oil to the disc pack tends to promote such an excessive accumulation of oil and separation of the discs by forcing the oil therebetween. This situation tends to arise whenever the closing pressure on the disc pack is at a minimum value such as at start-up. In an effort to alleviate this problem, the prior art teaches the use of additional pump controls to regulate and minimize to a zero value the pressure at which the oil is delivered to the disc pack.

SUMMARY OF THE INVENTION

The present invention provides a variable speed drive mounted within a housing having disc type clutch means operatively connected between input and output shafts and a supporting-coupling member for providing bearing support of the adjacent inboard ends of the shafts and transmitting torque. The support-coupling member comprises a stationary support extending from the housing and concentric bearing means for mounting a center coupling member in the stationary support to thereby provide rigid bearing support for the extreme inboard ends of the shafts. The concentric bearing means provide a first bearing member for permitting relative rotation between one of the shafts and the center coupling member which is operatively connected between the clutch and the other of the shafts. A second bearing member is disposed about the center coupling for permitting relative rotation between the center coupling and the stationary support member.

The support-coupling member provides rigid bearing support at the inboard ends of the shafts eliminating cantilever support thereof and the prior art problems associated with such arrangements. In addition, the support-coupling minimizes the amount of axially extending space required for interior support of the shafts by utilizing concentric bearing means. Consequently, the prior art problems associated with the size of the variable drive unit and the efficient utilization of the zone defined by the housing are substantially eliminated.

The present invention also provides the fluid supply means for delivering fluid or oil at a positive pressure to the rotating disc pack in a hydroviscous or wet, clutch or brake application. In an illustrated embodiment, the fluid supply means includes an annular, centrifugal pump mounted directly on a continuously rotating portion of the clutch or brake having pump exhaust ports in registry with fluid ducts to deliver fluid or oil to the disc pack.

The fluid supply means of the present invention provide a highly efficient, inexpensive cooling means for the rotating disc pack. The pump of the present invention eliminates the prior art problems associated with mounting the pump externally or at a remote location within the housing. Particularly, the pump utilizes a minimum amount of pump hardware in comparison to prior art structures and it does not require an independent support, drive or control. Further, the fluid or oil ducts associated with the pump are of a minimum length and conveniently positioned within the torque transmitting unit. Thus, it is not necessary to drill extensive oil duct channels in the shaft or provide other cooperating, connecting structure between the torque transmitting unit and the pump.

In addition, preload means are provided to initially axially load the disc pack to maintain a predetermined axial proximity of the discs and thereby prevent an excessive accumulation of oil intermediate the discs. In the illustrated embodiments, the preloading of the disc pack is provided by a plurality of spaced springs which work between an axially stationary member of the torque transmitting unit and the disc pack.

BRIEF DESCRIPTION OF THE DRAWINGS

FIG. 2 is an elevational view, partially in section, of another embodiment of the fluid supply means shown in FIG. 1 mounted on clutch means which are directly connected between input and output shafts; and, FIG. 3 is an elevational view, partially in section, of yet another embodiment of the fluid supply means shown in FIGS. 1 and 2 mounted on clutch means which are directly connected between input and output shafts.

DETAILED DESCRIPTION OF THE DRAWINGS

Figure 1:
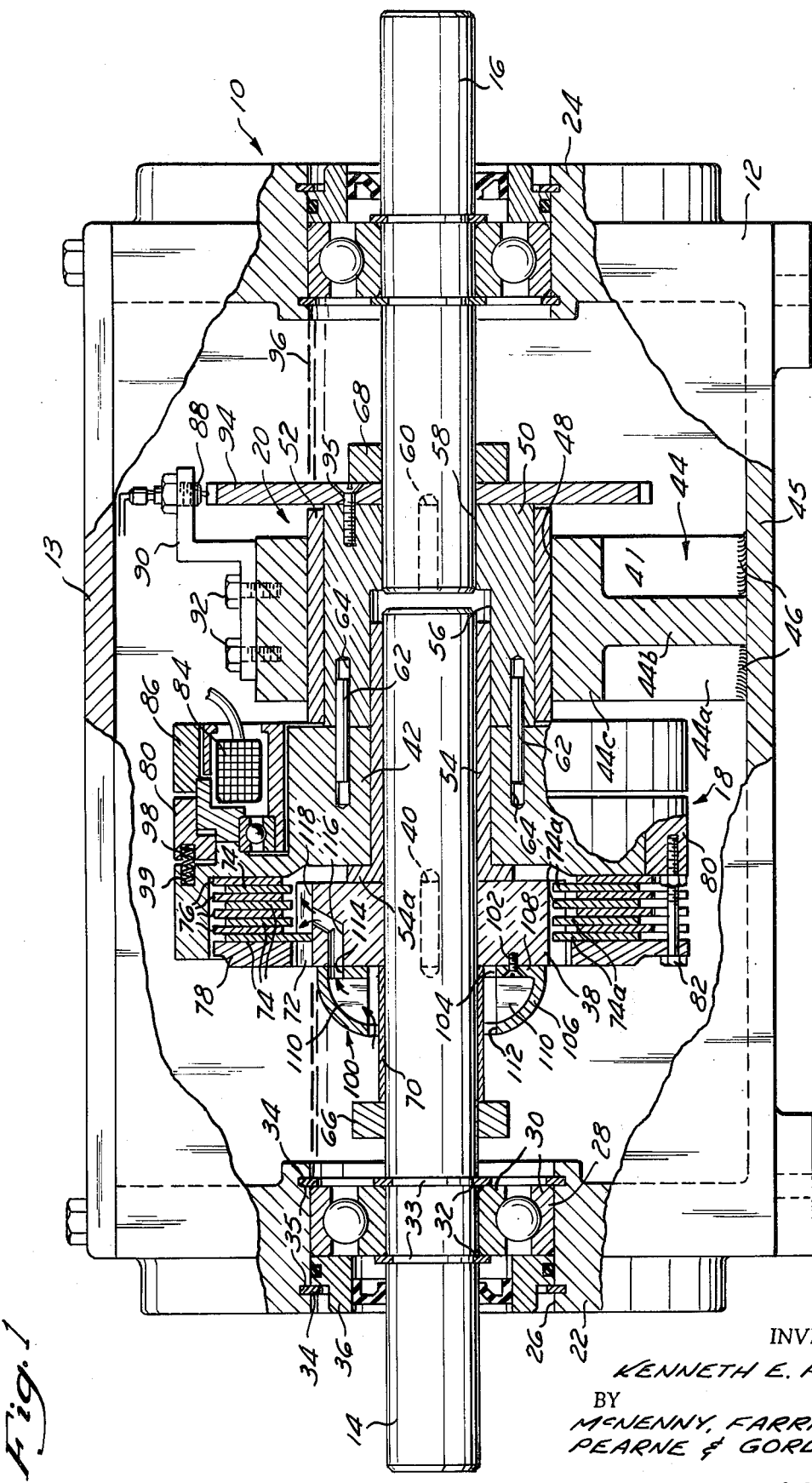
FIG. 1 is an elevational view, partially in section, of a variable speed drive unit mounted in a housing according to the present invention comprising clutch means operatively connected between input and output shafts, preload means for the clutch, fluid supply means mounted directly on the clutch means and support-coupling means, with parts broken away for purposes of illustration.

Referring to FIG. 1, there is shown a variable speed drive unit 10 mounted within a housing 12 having a removable top cover 13. The drive 10 includes axially aligned input shaft 14 and output shaft 16 which are operatively connected by means of an electromagnetic clutch 18 and a support-coupling 20. The input torque to the unit may be provided by connection of the input shaft to any suitable prime mover such as an electrical motor (not shown).

The shafts 14 and 16 are provided with outboard bearing support in or on oppositely disposed walls 22 and 24 respectively of the housing 12. The outboard bearing support provided for each of the shafts is identical and only that provided for the shaft 14 will be described in detail, it being understood that identical outboard bearing support is provided for the shaft 16.

The input shaft 14 extends through a shaft bore 26 provided in the wall 22 of the housing. The shaft is supported in the bore 26 by ball bearing 28 having inner and outer races 30. The shaft 14 is provided with cooperating snap rings 32 disposed within shaft mounting grooves 33 to restrain axial movement of the shaft with respect to the bearing 28. Similarly, the bearing is restrained against axial movement with respect to the housing by means of cooperating snap rings 34 disposed in mounting grooves 35 extending about the bore 26. An oil seal 36 is provided within the bore 26 to form a seal between the bore and the shaft.

The clutch 18 includes a continuously rotating drive gear 38 which is connected to the input shaft by a key 40. Accordingly, the output torque of the clutch in this arrangement is through the clutch body 42 and it is transmitted to the output shaft 16 by means of the support-coupling 20 as described in detail below.

The support-coupling 20 comprises a stationary web support 44 extending from a lower wall 45 of the housing 12. The web support is fixed to the housing by weld 46, however, it may be connected by any suitable means or integrally formed with the housing. Similarly, the web support may be connected to any of the walls of the housing or otherwise fixed between two opposed walls of the housing in any suitable manner.

The web support 44 as an inverted U-shape including oppositely disposed, downwardly extending legs 44a (only one leg is shown in FIG. 1) which are connected by a cross member 44b. The upper portion of the web support includes a collar 44c having a bore 48 therethrough which is in radial alignment with the shafts 14 and 16.

A center coupling 50 having an annular configuration is mounted within the bore 48 by means of a sleeve bearing 52 which permits relative rotation between the center coupling and the web support. A sleeve-thrust bearing 54 is provided for mounting the inboard end of the shaft 14 within the center coupling and permitting relative rotating therebetween. To that end, the center coupling provides a first shaft bore 56 which is arranged to provide bearing support for the inboard end of the shaft 14 and an oppositely disposed second shaft bore 58 for receiving the output shaft 16 and providing bearing support thereof. The center coupling is keyed to the output shaft by means of key 60.

As indicated above, the clutch output in this arrangement is through the clutch body 42 which transmits the output torque to the center coupling 50 by means of axially extending drive pins 62 press fitted within bores 64. Each of the bores 64 may be formed by drilling associated bore halves in the clutch body portion 42 and the center coupling 50 which cooperate to define the bores 64 and captively retain the drive pins therein when the drive unit is assembled. Any suitable number of angularly spaced drive pins may be employed for the transmission of torque. Accordingly, when the clutch 18 is engaged the output torque is transferred to the output shaft 16 by means of the center coupling 50.

It should be noted that the variable speed drive 10 could be oppositely connected so as to interchange the input and output functions of the shafts 14 and 16. A variety of mounting arrangements can be employed, however, it is frequently desirable to minimize the amount of clutch inertia which must be added to the load inertia. Accordingly, the input shaft is frequently connected to the clutch body which is the higher inertia member.

The axial alignment of the clutch 18 and the support-coupling 20 is maintained by a pair of oppositely disposed collar members 66 and 68 which are fixed to the shafts 14 and 16 respectively. The collar 66 cooperates with a sleeve 70 to maintain the axial position of the drive gear 38 against the flange 54a of the bearing 54. Similarly, the clutch body 42 and the center coupling 50 cooperates between the collar members 66 and 68 to maintain precise axial alignment of the clutch 18.

The support-coupling provides rigid bearing support at the extreme inboard ends of the shafts to thereby eliminate the structural deficiencies associated with the cantilever support of the shafts and the use of multiple bearings mounted within a cantilever arrangement. Of course, the elimination of cantilever support of the shafts results in a more efficient bearing structure and, therefore, the support-coupling requires a minimum amount of structure for a given loading to restrain the radial displacement of the shafts. The support-coupling also minimizes the axial length of the interior bearing support and the drive unit by virtue of the concentric disposition of the bearings.

The operation of the variable speed drive 10 is briefly summarized below. Initially, it is noted that the clutch 18 has a generally cylindrical configuration and the plane of the section is not along a single diameter but rather along two intersecting radii in order to more clearly show the structure of the clutch.

Although clutch 18 is electromagnetic, the teachings of the present invention are equally applicable to clutches which do not utilize electromagnetic means for closing the disc pack and control of the output torque. Similarly, it should be appreciated that the variable speed drive 10 may be provided with a disc type brake (not shown) mounted on the output shaft and operatively fixed to the housing to provide braking engagement with the shaft.

The input to the clutch 18 is through the drive gear 38 having gear teeth 72 splined with inner drive discs 74. Interleaved with the drive discs 74 there are, of course, outer driven discs 76 which are splined with the clutch body 42 as shown in the lower portion of the clutch in FIG. 1. The axial proximity of the interleaved discs 74 and 76 or disc pack is controlled by a pressure plate 78 which may be actuated to impose a closing pressure upon the disc pack.

The pressure plate 78 is connected to an armature 80 by means of bolts 82. The excitation of a stationary coil 84 sets up a magnetic flux circuit which attracts the armature 80 towards an outer field ring 86 to thereby close the disc pack by the following movement of the pressure plate 78 against the disc pack. Accordingly, adjustment of the voltage in the coil 84 regulates the attraction of the pressure 78, the frictional fluid engagement of the discs 74 and 76, and the output speed of the unit.

The speed of the output shaft 16 is monitored by a magnetic pickup 88 carried by a bracket 90 which is mounted on the web support 44 by bolts 92. The magnetic pickup senses the rotational speed of a pulse gear 94 which is secured to the center coupling by bolts 95 (only one bolt is shown in FIG. 1). The magnetic pickup provides a feedback signal or voltage which is compared with a preselected set-point signal or reference voltage in a servo control system (not shown). Any deviation in the compared voltages results in an error signal which increases or decreases the voltage in the coil 84 to regulate the axial proximity of the discs 74 and 76 and the output speed of the unit.

The clutch 18 is a hydroviscous clutch wherein the torque is transmitted by a film of fluid or oil maintained between the adjacent discs and, more particularly, the rate of shear of the oil film between adjacent discs. To that end, a supply or sump of oil 96 is maintained within the housing 12 for delivery to the discs as described in greater detail below.

In hydroviscous as well as wet applications, it is desirable to avoid the formation of an excessively thick film of oil between the adjacent discs since it will prevent the transmission of torque. The formation of such a film is most apt to occur at start-up of when the discs are not subjected to a significant closing pressure. This is especially likely to occur when a pumping means is employed in the system to deliver cooling fluid to the discs at a positive pressure, since the fluid may be forced between the discs causing the separation thereof and the formation of an excessively thick fluid film.

The physical elimination of an existing, overly thick oil film requires an excessive increase in closing pressure on the disc pack to squeeze it out from between the discs. The closing pressure is excessive in the sense it is greater than the desired running or steady-state value and it must be rapidly decreased after elimination of the thick film to maintain control of the output torque and speed. Such rapid changing requirements cause control fluctuations and hunting in the control system.

The elimination of the thick oil film is a relatively rapid phenomenon once sufficient closing pressure is developed. Thus, the output torque simultaneously surges from its zero value due to the excessive closing pressure being applied to the disc pack upon elimination of the overly thick oil film. This is, of course, undesirable since the load is exposed to an abrupt torquing resulting in undue mechanical stress.

The present invention eliminates the formation of an excessively thick film of oil by axially preloading the disc pack or discs 74 and 76 to maintain relatively close proximity and a predetermined axial loading thereof even when the clutch is not engaged. The preloading of the discs is efficiently and economically accomplished by a plurality of springs, such as spring 98, provided at angularly spaced locations about the periphery of the clutch to provide uniform loading of the disc pack. The springs 98 work between the armature 80 and the axially stationary clutch body 42.

Each of the springs 98 is captively retained within a spring chamber 99. The chamber 99 is defined by associated chamber halves formed in clutch body 42 and armature 80 during assembly of the clutch. Thus, the spring 98 is held captive within the chamber 99 when the clutch is in the assembled condition.

The preloading of the disc pack may also be provided by actuation of the clutch closing means prior to or simultaneously with start-up. For example, an actuating preloading voltage may be constantly provided to excite the stationary coil 84 of the electromagnetic clutch 18 independent of the servo control system (not shown) and maintain a predetermined loading of the disc pack. Alternatively, a sequential relay circuit (not shown) may be used to provide an initial preloading voltage to the coil. In this instance, the sequencing circuit may be triggered by the start-up of a prime mover (not shown) to temporarily close the disc pack simultaneously with the actuation of the prime mover. In either case, the disc pack is effectively preloaded to prevent the accumulation of oil and the formation of an excessively thick oil film intermediate the adjacent discs.

As previously indicated, the dissipation of heat in a disc type torque transmitting unit is a critical design parameter. The use of cooling fluids such as oil 96 has been found to be most effective when delivered to the disc pack by pumping action. The present invention provides a fluid supply means for delivering cooling fluid or oil to the disc pack at a positive pressure. To that end, the fluid supply means includes a centrifugal pump 100 mounted directly on the continuously rotating drive gear 38 and disposed below the level of the oil 96. The pump is connected to the drive gear by suitable means such as a countersunk screw 102. Thus, the torque transmitting unit and fluid supply means are integrally arranged to provide a unitized package according to the teachings of the present invention.

The operation of the pump is independent of the output speed or percent relative slip since it is mounted on a continuously rotating or input portion of the clutch. This is especially advantageous when the load is stalled and 100 percent relative slip exists. Under such conditions, the fluid supply means of the present invention effectively prevented clutch burn out and maintained substantially normal oil operating temperatures throughout a 500 hour test period.

The pump 100 is disposed about the input shaft and includes an internal bore 104 for receiving the shaft 14 and the sleeve 70. The pump has a generally annular configuration and it includes an arcuate shroud 106 extending from a rear pump wall 108. The wall 108 is provided with a planar configuration adapted to be contiguously disposed against the drive gear 38. A plurality of radially extending vanes 110 are provided at angularly spaced positions within the pump. The radial vanes are connected between the arcuate shroud 106 and the rear pump wall 108.

The bore 104 of the pump defines an intake port 112 at the end of the bore axially spaced from the gear 38. Thus, the intake port 112 has an annular configuration defined by the radially innermost portion of the shroud 106 and the sleeve 70 carried by the shaft 14.

The rotation of the pump draws the oil 96 axially, inwardly through the intake port 112. The pump output is through angularly spaced exhaust ports 114 (only one part is shown in FIG. 1) extending through the rear wall 108 of the pump. Each of the exhaust ports is in registery with a first fluid duct 116 extending generally, axially through the drive gear 38 at a location radially spaced from the shaft 14. Each of the fluid ducts 116 communicates with a second fluid duct 118 located adjacent the radially innermost portion of the discs 74 and 76.

The fluid ducts 118 are defined and formed by the removal of angularly spaced, aligned rows of engaging disc teeth 74a of the discs 74. As previously indicated, the section of FIG. 1 is not along a diameter through the clutch 18 and the fluid duct 118 is shown in the upper portion of the clutch whereas the lower portion illustrates the engaged teeth 74a. Referring to the upper portion of the clutch, it should be noted that the engaging tooth 74a of the axially outermost disc 74 is not removed and forms an end seal for the fluid duct 118. Of course, this tooth could also be removed and a separate seal provided.

It should be appreciated that one of the gear teeth 72 of the drive gear 38 could alternatively be removed to define and form each of the fluid ducts 118. In this instance, a separate end seal corresponding to that provided by the tooth 74a of the first disc 74 would be provided. In addition, each of the fluid ducts 118 may be defined and formed by the removal of a row of disc teeth 74a and an adjacent gear tooth 72. Thus, the pump and fluid ducts cooperate to deliver the oil 96 at a positive pressure adjacent the radially innermost portions of the disc pack to provide efficient flow and uniform heat dissipation.

The oil 96 is delivered at a positive pressure to the fluid duct 118 and it is additionally pumped radially, outwardly by the rotating discs 74 and 76 which function somewhat like a centrifugal pump. The delivery of oil to the disc pack at a positive pressure does not result in the formation of excessively thick oil films between the discs since the preloading means effectively overcomes this prior art problem as indicated above. Accordingly, the circulation of the oil and the cooling effect thereof is maximized.

In comparison tests, the heat dissipating ability of an identically sized dry clutch measured in Footpounds of Energy per Unit Time at a given rate of cycling is increased by a factor of 30. Similarly, the heat dissipating ability of a wet clutch is increased by approximately a factor of 15 when the teachings of the present invention are employed.

The pump is disposed adjacent the axial or lateral extremity of the clutch and, therefore, it is axially spaced relative to the disc pack and it does not interfere with radial dimensions of the discs. In contrast, some prior art devices utilize a pump which is axially aligned with the clutch and disc pack and require a special input or output shaft having vanes extending therefrom. The vanes are disposed under and adjacent the innermost portion of the disc pack. These prior art devices result in an undesirably large clutch and disc pack diameters for a given disc surface area, in comparison with the teachings of the present invention, since the innermost radial dimension of the prior art disc pack is necessarily enlarged to accommodate the pump.

In addition to minimizing the clutch and disc pack diameters for a given disc surface area and eliminating the requirement of special shafts, the pump of the present invention utilizes a minimum amount of axial space. For example, in a typical design the pump requires less than one-half inch additional axial space to provide sufficient fluid flow.

It should be appreciated that the teachings of the present invention are equally applicable to wet and hydroviscous torque transmitting units of the disc type including units which use a plurality of interleaved discs such as the clutch 18 as well as those which employ a single pair of mated discs. In addition, the particular type of closing or actuation means of the unit is immaterial. For example, the unit may be provided with hydraulic or pneumatic closing means as demonstrated by the embodiments of the present invention described hereinafter.

Referring to FIG. 2, there is shown a hydraulic clutch 120 connected between an input shaft 122 and an output saft 124. For purposes of simplification, the clutch 120 has been illustrated in a direct connection with the shafts and the remaining drive unit structure has been omitted, however, it should be appreciated that the clutch 120 may be mounted in conjunction with the drive unit 10 and support-coupling 20 as shown in FIG. 1.

In this embodiment, the rotational input to the clutch is through a clutch collar 126 which is connected to the input shaft by a key 128. The collar is fastened to a cup or spider 130 by suitable means, and they are both spaced from a clutch body or hub 138 by a thrust bearing 131.

The cup 130 has an annular configuration and it is arranged to engage the teeth of outer drive discs 132 within tangs 134. The drive discs 132 are interleaved with inner driven discs 136 which are splined to the hub 138. The hub 138 is connected to the output shaft 124 by a key 142.

The clutch is actuated by a hydraulic pressure source (not shown) supplying hydraulic fluid under pressure to a stationary cylinder 144. To that end, the stationary cylinder provides a bore 146 communicating with a chamber 148 defined between the stationary cylinder 144 and an annular thrust member 150. The chamber 148 is closed by means of sealing rings 152. The annular thrust member 150 works against a closing plate 154 by means of a needle thrust bearing 156 disposed therebetween. The discs 132 and 136 are closed against a back plate 158 which is splined to the hub 138 and restrained against outward axial movement by snap ring 160.

A pump 161 is mounted directly on the continuously rotating clutch collar 126 and provides an internal bore 162 for receiving the shaft 122. The pump includes a rear wall 164 which is connected to the collar 126 by any suitable means and a shroud 166 which has an L-shaped cross section. The radially innermost extent of the shroud 166 defines an annular pump intake port 170 about the shaft 122.

A plurality of radially extending vanes 168 (only one vane is shown) are connected between the rear wall 164 and the shroud 166. It should be appreciated that the performance of the pump can be modified by providing an inclined leading edge 168a on the vane. In this instance, the leading edge 168a extends between the radially innermost extent of the shroud 166 and the bore 162.

The pump is provided with a number of angularly spaced exhaust ports 172 (only one port is shown) extending through the rear wall 164. Each of the exhaust ports communicates with a fluid duct 174 extending through the collar 126, the cup 130 and the thrust bearing 131. The fluid duct 174 communicates with an annular duct 176 defined by the thrust bearing 131 and the hub 138. The hub 138 is provided with a fluid duct 178 which communicates with the annular duct 176. A plurality of angularly spaced ducts 178 may be provided in the hub 138 and, of course, the ducts 178 are in constant communication with the annular duct 176 regardless of the rotation of the hub 138.

Each of the fluid ducts 178 communicates with a fluid duct 180 which corresponds to the fluid duct 118 in a embodiment shown in FIG. 1. Accordingly, the fluid ducts 180 may be formed by removing angularly spaced rows of engaging teeth of the discs 136 as depicted or, alternatively, removing corrresponding gear teeth 182 of the hub 138. In the embodiment shown in FIG. 2, the fluid ducts 180 are closed at their axial ends by the closing plate 154 and the snap ring 160.

The preloading of the discs 132 and 136 to prevent the accumulation of excessive fluid or oil intermediate the discs is provided by a spring 184 captively retained within a spring chamber 185. The spring 184 works between the axially stationary cylinder 144 and the annular thrust member 150 to maintain a predetermined loading of the discs when the clutch is not engaged. Of course, a plurality of angularly spaced springs are employed to provide uniform preloading of the disc pack.

The preloading of the disc pack may also be provided by actuation of the clutch closing means in a manner similar to that previously described with respect to the clutch 18. In this instance, a constant hydraulic preloading pressure may be maintained within the chamber 148 by appropriately arranged relief and one way valves (not shown) or a sequencing circuit (not shown) triggered by start-up of a prime mover may be utilized to intially preload the disc pack.

Referring to FIG. 3, another embodiment of the present invention is illustrated. In this embodiment, a hydraulic clutch 186 having a pump 188 connected to a continuously rotating portion thereof is shown. Similar to the embodiment shown in FIG. 2, the clutch 186 is directly connected between an input shaft 190 and an output shaft 192 and the remaining drive unit structure is omitted. The operation of the clutch 186 is essentially identical to that of the clutch 120 except that it has been reversely mounted to illustrate the versatility of the fluid supply means of the present invention.

In this embodiment, the rotational input of the shaft 190 is transmitted directly to a hub 194 which is connected to the input shaft by a key 196. The input torque is transmitted to inner drive discs 198 which engage the gear teeth 200 of the hub. Outer driven discs 202 are interleaved with the discs 198 to transmit torque to the cup or spider 204. A collar 206 is press fitted within a bore 207 defined by the cup 204 and it is connected to the output shaft by a key 208.

The pump 188 is similar to the pump 127 and it includes a shroud 210 projecting from a rear wall 212 and radially extending vanes 214. An annular intake port 216 is defined about the shaft 190 and exhaust ports 218 extending through the rear wall 212 are provided. Each of the exhaust ports 218 is in registery with a first fluid duct 220 extending through the hub 194 and communicating with a second fluid duct 222. The second fluid duct is defined and formed in a manner identical to the fluid ducts 118 and 180.

As shown in the various embodiments of the present invention, the direct mounting of the pump means on a continuously rotating portion of the torque transmitting unit requires a minimum of space and pump hardware in comparison with the teachings of the prior art. Particularly, the pump means and fluid ducts of the present invention provide a fluid supply means which is integral with the torque transmitting unit and does not require an independent support, drive or control. Thus, it is not necessary to provide additional apparatus or modify existing structures to provide efficient and inexpensive heat dissipating fluid supply means according to the teachings of the present invention.

As further illustrated by the embodiments, the pump may be disposed adjacent either of the axial or lateral extremities of a particular torque transmitting unit and various pumps may be readily employed with the unit. In fact, a standard dry unit may be readily modified to a wet or hydroviscous application by addition of a pump and provision of appropriate fluid ducts according to the teachings of the present invention.

The multiplicity of short-direct fluid ducts of the present invention provides a greater cross sectional flow area which permits delivery of a larger volume of cooling fluid or oil at a lower pressure than is possible according to the prior art teachings relating to drilled fluid channels in the input or output shaft. Further, it is not necessary to provide additional pump controls to minimize the pressure of oil delivery and the tendency to force the discs apart, since the preload means effectively eliminates this prior art problem.

In addition, since the torque transmitting unit and fluid supply means are a unitized package and they do not depend upon the provision of a specially designed input or output shaft, several of these units may be easily mounted in one housing, or they may be mounted on a single shaft as is required in a multiple speed shifting transmission with no difficulty in providing fluid flow to each of the units. In comparison, the provision of fluid flow in such a transmission according to the prior art teachings is quite cumbersome. Further, the provision of an integral torque transmitting unit and fluid supply means to provide such a unitized package facilitates installation, subsequent removal for service or repair, and permits the maintenance of an inventory of such units for replacement purposes in the drive.

The invention is not restricted to the slavish imitation of each and every one of the details described above, which have been set forth merely by way of example with the intent of most clearly setting forth the teachings of the invention. Obviously, devices may be provided which change, eliminate, or add certain specific details without departing from the invention.

What is claimed is:

1. A torque transmitting unit of the disc type wherein films of fluid are maintained between adjacent discs for purposes of torque transmission comprising first disc means adapted to be operatively connected to a shaft and second disc means adapted to be operatively connected to an element, closing means for controlling the relative axial proximity of the first and second disc means to thereby control the thickness of fluid films between adjacent disc means and the transmission of torque, and fluid supply means disposed in a sump of fluid such as oil or the like contained within a housing of the torque transmitting unit to continuously deliver fluid to the disc means, the fluid supply means including a centrifugal pump mounted on a continuously rotating portion of the torque transmitting unit disposed within the fluid sump and fluid duct means radially spaced from the shaft for channeling fluid from the pump means to the disc means, one of said disc means being coupled by rows of slidably engaged teeth to said torque transmitting unit and said fluid duct means including a channel portion provided by the removal of at least a major portion of at least one of said rows of engaged teeth.

2. A torque transmitting unit as set forth in claim 1 wherein said centrifugal pump is disposed adjacent an axial extremity of said torque transmitting unit and includes radially extending vanes spaced from the shaft.

3. A torque transmitting unit as set forth in claim 2 wherein said centrifugal pump has an annular configuration defining a pump intake port about said shaft axially spaced from said continuously rotating portion of the torque transmitting unit, and oppositely disposed pump exhaust ports in registery with said fluid duct means.

4. A torque transmitting unit as set forth in claim 1 wherein said closing means includes preload means to provide an initial axial loading of the disc means and thereby maintain a predetermined proximity thereof which eliminates the formation of an excessive accumulation of fluid between the disc means.

5. A torque transmitting unit as set forth in claim 4 wherein said preload means comprises spring means working against an axially stationary portion of the torque transmitting unit.

6. A unitized torque transmitting unit of the disc type wherein films of fluid are maintained between adjacent discs for purposes of torque transmission comprising first disc means adapted to be operatively connected to a shaft and second disc means adapted to be operatively connected to an element, closing means for controlling the relative axial proximity of the first and second disc means to thereby control the thickness of fluid films between adjacent disc means and the transmission of torque, and fluid supply means disposed in a sump of fluid such as oil or the like contained within a housing for the torque transmitting unit to continuously deliver fluid to the disc means, the fluid supply means including pump means entirely located within the housing and comprising a centrifugal pump mounted on a continuously rotating portion of the torque transmitting unit disposed within the sump of fluid, and fluid duct means radially spaced from the shaft for channeling fluid from the pump means to the disc means, said fluid duct means comprising communicating first and second duct means, said second duct means cooperating with the disc means to define a chamber located adjacent and radially inward of the radial innermost extent of the disc means and extending along substantially the entire axial extent thereof, whereby fluid is delivered at a substantially uniform pressure adjacent the radial innermost extent of the disc means without applying direct axial fluid pressure loads thereto, said centrifugal pump being disposed adjacent an axial extremity of said torque transmitting unit and below the level of the sump of fluid, said centrifugal pump comprising the sole pump member of said fluid supply means and including radially extending vanes spaced from the shaft for drawing fluid directly from the surrounding sump of fluid through an intake port defined by the pump and the radially spaced vanes about the shaft.

7. A unitized torque transmitting unit as set forth in claim 4 wherein said intake port communicates with the sump of fluid radially inwardly of at least a majority of the radial extent of said vanes.

8. A unitized torque transmitting unit as set forth in claim 7 wherein said centrifugal pump has an annular configuration and includes pump exhaust ports in registery with said fluid duct means and oppositely disposed from said intake port.

9. A unitized torque transmitting unit as set forth in claim 4 wherein said first duct means communicates with said second duct means adjacent a substantially central location along the axial extent thereof.

10. A unitized torque transmitting unit of the disc type for controlling the transmission of torque, between a shaft and an element comprising first disc means adapted to be operatively connected to a shaft and second disc means adapted to be operatively connected to an element, closing means for controlling the relative axial proximity of the first and second disc means to thereby control the transmission of torque, fluid supply means adapted to be disposed in a sump of fluid such as oil or the like contained within a housing of the torque transmitting unit and to deliver fluid to the disc means, the fluid supply means comprising a centrifugal pump mounted on a continuously rotating portion of the torque transmitting unit to provide an integral unit therewith and including fluid duct means radially spaced from a received shaft for channeling fluid from the centrifugal pump to the disc means, said fluid duct means including a duct portion which cooperates with the disc means to define an axially extending chamber located at the radial innermost extent of the disc means and radially inward thereof to thereby deliver fluid at a substantially uniform pressure to the disc means substantially free of direct axial fluid pressure loads, said centrifugal pump being arranged to be disposed below the level of the sump of fluid contained within the housing and defining an intake port about the received shaft for drawing fluid directly from the surrounding sump of fluid, said centrifugal pump comprising the sole pump member of said fluid supply means, said first and second disc means, closing means, and fluid supply means comprising a unitary assembly adapted to be separately fabricated for use as a part of a more inclusive torque transmitting system which includes a shaft, an element, and a fluid sump.

11. A unitized torque transmitting unit as set forth in claim 10 wherein said fluid supply means include radially extending vanes spaced from the received shaft and said intake port is disposed radially inwardly of at least a majority of the radial extent of said vanes.

12. A unitized torque transmitting unit as set forth in claim 10 wherein said centrifugal pump is disposed adjacent an axial extremity of said torque transmitting unit.

13. A unitized torque transmitting unit as set forth in claim 12 wherein said centrifugal pump includes pump exhaust ports oppositely disposed from said intake port and in registery with said fluid duct means.

14. A unitized torque transmitting unit as set forth in claim 10 wherein said duct portion comprises an open channel extending along the root diameter of the disc means.

* * * * *

UNITED STATES PATENT OFFICE
CERTIFICATE OF CORRECTION

PATENT NO. : 3,912,060
DATED : October 14, 1975
INVENTOR(S) : Kenneth E. Handke

It is certified that error appears in the above-identified patent and that said Letters Patent are hereby corrected as shown below:

Column 5, line 11, "as" should read --has--.

Column 5, line 60, "cooperates" should read --cooperate--.

Column 6, line 39, after "pressure" insert --plate--.

Column 9, line 51, "saft" should read --shaft--.

Column 10, line 47, "a" should read --the--.

Column 13, line 37, the number "4" should read --6--.

Column 13, line 46, the number "4" should read --6--.

Signed and Sealed this

*thirteenth* Day of *January 1976*

[SEAL]

Attest:

RUTH C. MASON
*Attesting Officer*

C. MARSHALL DANN
*Commissioner of Patents and Trademarks*